(12) United States Patent
Klein et al.

(10) Patent No.: US 11,126,319 B2
(45) Date of Patent: Sep. 21, 2021

(54) MIXED REALITY DEVICE GAZE INVOCATIONS

(71) Applicant: Microsoft Technology Licensing, LLC, Redmond, WA (US)

(72) Inventors: Andrew Jackson Klein, Vancouver (CA); Ethan Harris Arnowitz, Vancouver (CA); Cory Ryan Bramall, Delta (CA); Victor Jia, Richmond (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/530,446

(22) Filed: Aug. 2, 2019

(65) Prior Publication Data

US 2020/0272231 A1    Aug. 27, 2020

Related U.S. Application Data

(60) Provisional application No. 62/808,848, filed on Feb. 22, 2019.

(51) Int. Cl.
*G06F 3/0481* (2013.01)
*G06F 3/0482* (2013.01)
(Continued)

(52) U.S. Cl.
CPC ....... *G06F 3/04815* (2013.01); *G02B 27/017* (2013.01); *G02B 27/0172* (2013.01);
(Continued)

(58) Field of Classification Search
CPC .......... G06F 3/013; G06F 3/011; G06F 3/012; G06F 3/04842; G06F 3/0482;
(Continued)

(56) References Cited

U.S. PATENT DOCUMENTS 9,143,880 B2    9/2015    Vennstrom et al.
9,442,567 B2    9/2016    Scott et al.
(Continued)

FOREIGN PATENT DOCUMENTS

WO    2019022836 A1    1/2019

OTHER PUBLICATIONS

"Lands End VR Gameplay—samsung Galaxy Gear VR Gameplay W Face Cm", Retrieved from: https://www.youtube.com/watch?v=73IMCSpr--g&feature=youtu.be, Published Date: Mar. 30, 2016, 4 Pages.

(Continued)

*Primary Examiner* — Maryam M Ipakchi
(74) *Attorney, Agent, or Firm* — Davin Chin; Chin IP, PLLC

(57) ABSTRACT

The disclosed technology is generally directed to mixed reality, augmented reality, and/or virtual reality devices. In one example of the technology, a first hologram is caused to be displayed to an operator with a first gaze selection area that is associated with a first selectable option. A gaze location that is associated with a gaze of the operator is evaluated. Responsive to the gaze location coinciding with the first gaze selection area of the first hologram, a first gaze dwell timer is begun. A total duration of the first gaze dwell timer is adjusted based on the gaze location being in a specific portion of the first gaze selection area. Responsive to the gaze dwell timer finishing, the first selectable option is caused to be selected.

20 Claims, 8 Drawing Sheets

(51) Int. Cl.
  *G06F 3/01*      (2006.01)
  *G06F 3/0484*    (2013.01)
  *G06T 19/00*     (2011.01)
  *G06T 19/20*     (2011.01)
  *H04L 29/06*     (2006.01)
  *G02B 27/01*     (2006.01)
  *G09G 5/37*      (2006.01)
  *G09B 5/02*      (2006.01)
  *G09B 19/00*     (2006.01)
  *G06F 3/16*      (2006.01)

(52) U.S. Cl.
  CPC .............. *G06F 3/011* (2013.01); *G06F 3/012* (2013.01); *G06F 3/0482* (2013.01); *G06F 3/04845* (2013.01); *G06T 19/006* (2013.01); *G06T 19/20* (2013.01); *G09B 5/02* (2013.01); *G09B 19/003* (2013.01); *G09G 5/37* (2013.01); *H04L 67/38* (2013.01); *G02B 2027/0141* (2013.01); *G02B 2027/0174* (2013.01); *G06F 3/013* (2013.01); *G06F 3/017* (2013.01); *G06F 3/167* (2013.01); *G06T 2200/04* (2013.01); *G09G 2354/00* (2013.01)

(58) Field of Classification Search
  CPC .. G06F 3/04815; G06F 3/167; G06F 3/04817; G06F 2203/0381; G02B 2027/0187; G02B 27/017; G02B 2027/0138; G02B 27/01; G02B 2027/0174
  See application file for complete search history.

(56) References Cited

U.S. PATENT DOCUMENTS

| | | | |
|---|---|---|---|
| 9,696,800 B2* | 7/2017 | Yoon | B60K 37/06 |
| 9,804,753 B2 | 10/2017 | Ramsby et al. | |
| 9,983,666 B2* | 5/2018 | Lankford | G06F 3/013 |
| 2009/0199857 A1* | 8/2009 | Peake | A61M 16/06 |
| | | | 128/206.28 |
| 2014/0354533 A1 | 12/2014 | Swaminathan | |
| 2014/0354539 A1 | 12/2014 | Skogo et al. | |
| 2015/0293587 A1 | 10/2015 | Wilairat et al. | |
| 2016/0008660 A1* | 1/2016 | Thurman | G06F 1/1694 |
| | | | 473/223 |
| 2016/0132106 A1* | 5/2016 | Yoon | G06F 3/0482 |
| | | | 345/158 |
| 2016/0246378 A1* | 8/2016 | Sampanes | G06F 3/016 |
| 2017/0052373 A1 | 2/2017 | Memmott et al. | |
| 2017/0293402 A1 | 10/2017 | Morris et al. | |
| 2017/0358141 A1* | 12/2017 | Stafford | G06F 3/011 |
| 2018/0116040 A1* | 4/2018 | Mann | H05B 47/19 |
| 2018/0150204 A1* | 5/2018 | Macgillivray | G06F 3/04842 |
| 2018/0173417 A1 | 6/2018 | Foresti | |
| 2018/0284962 A1* | 10/2018 | Ballard | G06F 3/017 |
| 2019/0005674 A1* | 1/2019 | Chang | G06K 9/00248 |
| 2019/0034057 A1 | 1/2019 | Rudchenko et al. | |

OTHER PUBLICATIONS

"Non Provisional Application as Filed in U.S. Appl. No. 15/958,632", dated Apr. 20, 2018, 31 Pages.

Spakov, et al., "On-line Adjustment of Dwell Time for Target Selection by Gaze", In Proceedings of Third Nordic Conference on Human-Computer Interaction, Oct. 23, 2004, pp. 203-206.

Majaranta, et al., "Fast Gaze Typing with an Adjustable Dwell Time", In Proceedings of SIGCHI Conference on Human Factors in Computing Systems, Apr. 6, 2009, pp. 357-360.

"International Search Report and Written Opinion Issued in PCT Application No. PCT/US2020/014681", dated May 14, 2020, 14 Pages.

* cited by examiner

MIXED REALITY DEVICE GAZE INVOCATIONS

CROSS-REFERENCE TO RELATED APPLICATION(S)

This application claims priority to U.S. Provisional Pat. App. No. 62/808,848, filed Feb. 22, 2019, entitled "MIXED REALITY USER INTERFACE". The entirety of this aforementioned application is incorporated herein by reference.

BACKGROUND

Typically, mixed reality (MR) refers to a combination of virtual and real environments to produce new environments and visualizations where physical and digital objects co-exist and can be interacted with in real time. Typically, mixed reality takes place not only in the physical world or the virtual world, but includes a mix of elements from reality and virtual reality, encompassing both augmented reality and augmented virtuality via immersive technology.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to mixed reality, augmented reality, and/or virtual reality devices. In one example of the technology, a first hologram is caused to be displayed to an operator with a first gaze selection area that is associated with a first selectable option. In some examples, a gaze location that is associated with a gaze of the operator is evaluated. In some examples, responsive to the gaze location coinciding with the first gaze selection area of the first hologram, a first gaze dwell timer is begun. In some examples, a total duration of the first gaze dwell timer is adjusted based on the gaze location being in a specific portion of the first gaze selection area. In some examples, responsive to the gaze dwell timer finishing, the first selectable option is caused to be selected.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
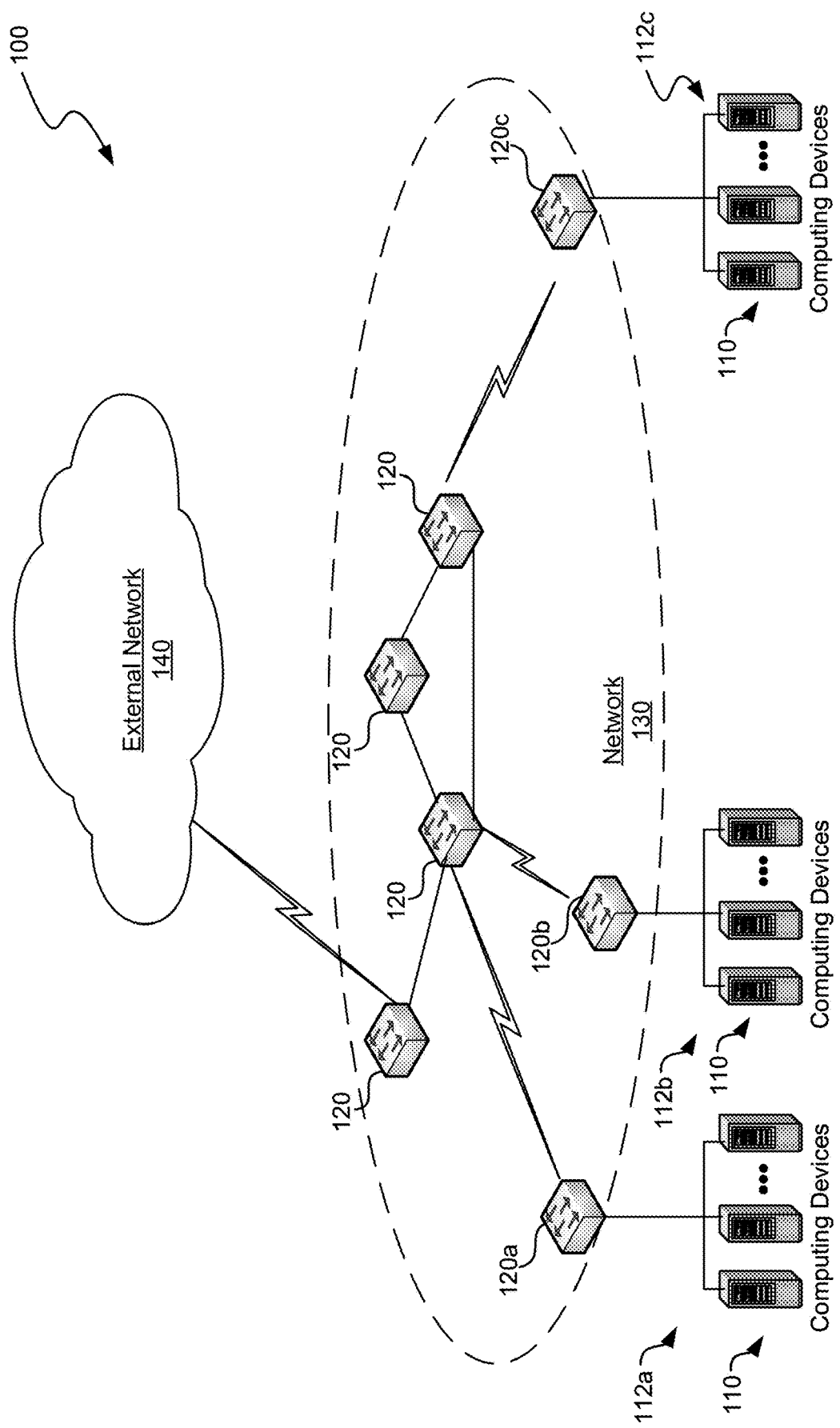
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to mixed reality, augmented reality, and/or virtual reality devices. In one example of the technology, a first hologram is caused to be displayed to an operator with a first gaze selection area that is associated with a first selectable option. In some examples, a gaze location that is associated with a gaze of the operator is evaluated. In some examples, responsive to the gaze location coinciding with the first gaze selection area of the first hologram, a first gaze dwell timer is begun. In some examples, a total duration of the first gaze dwell timer is adjusted based on the gaze location being in a specific portion of the first gaze selection area. In some examples, responsive to the gaze dwell timer finishing, the first selectable option is caused to be selected.

An operator may wear a wearable mixed-reality, augmented-reality, or virtual-reality device, such as a head-mounted display mixed-reality device that provides the operator with a mixed-reality view. The device may include holograms in the view, where the holograms may include selectable buttons. The buttons may be selected by the gaze of the operator, and in some examples may also be selected by other means, such as gestures, voice, and/or the like.

The gaze of the operator in the environment may be indicated in some manner, such as via a visual cursor that shows the location of the operator's gaze in the environment. To select a button or a hologram via gaze, the operator may move the operator's gaze to the selection area of the button or hologram. The selection area of a button may be the entire button, a specific subset of the button, or another suitable area designated for selection of the corresponding selectable option.

In some examples, when the operator's gaze enters a selection area, a gaze dwell timer associated with the selectable option that corresponds to the entered selection area begins. For example, the gaze dwell timer may be two seconds by default in some examples. In other examples, other suitable durations for the gaze dwell timer may be employed. In some examples, responsive to the operator's gaze remaining in the selection area for the entire duration of the gaze dwell timer, the corresponding selectable option becomes selected. For example, the button may be considered pressed, clicked, or otherwise selected.

Responsive to the operator's gaze leaving the selection area prior to the expiration of the timer, in some examples, the gaze dweller timer is turned off and reset, to begin anew should the operator's gaze enter the selection area again. In some examples, visual and/or auditory indications of a gaze selection in progress may be provided to the operator, along with a visual and/or auditory indication when the selection is complete. For example, a click sound may occur when the selection is complete.

In some examples, the selection in progress is not considered to begin immediately upon the operator's gaze entering the selection area. For example, when the operator's gaze first enters the selection area, the gaze dwell timer may begin, but the gaze may be considered hovering over the selection area, with no visual or auditory indication of a selection in progress being made when the operator's gaze first enters the selection area. However, when the gaze dwell timer reaches halfway to expiration, a selection in progress may be indicated, with the corresponding visual and auditory indications being provided. In these examples, by not indicating a selection in progress immediately upon the operator's gaze entering a selection area in these examples, the operator need not be distracted or annoyed by a selection beginning when the operator's gaze is merely moving through the selection area on the way to some other location, or happens to be momentarily hovering in the selection area for some other reason.

In some examples, the total duration of the gaze dwell timer may be adjusted based on the operator's gaze being on a specific portion of the selection area.

For instance, in some examples, the gaze dwell timer may be adjusted responsive to the operator's gaze being in the left or right portion of the selection area. As one example, the total duration of the gaze dwell timer may be increased, thus slowing down the selection in progress, when the operator's gaze is in a left portion of the selection area, and the total duration of the gaze dwell timer may be decreased, thus speeding up the selection in progress, when the operator's gaze is in a right portion of the selection area. In this way, in these examples, the operator can control the speed of the selection in progress. The operator may receive feedback on the adjustment in speed in multiple ways, including visually, for example by seeing the selection area fill at the corresponding speed of the selection, and/or auditorily, by adjusting the sound corresponding to the selection in progress to indicate the speed at which the selection in progress is occurring.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-412c. In the illustrated example, each of host sets 112a-412c is operatively coupled to a corresponding network node 120a-420c, respectively, which are commonly referred to as "top-of-rack" or "TOR" network nodes. TOR network nodes 120a-420c can then be operatively coupled to additional network nodes 120 to form a computer network in a hierarchical, flat, mesh, or other suitable types of topology that allows communications between computing devices 110 and external network 140. In other examples, multiple host sets 112a-412c may share a single network node 120. Computing devices no may be virtually any type of general-or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/ or other suitable computing services.

Although FIG. 1 shows an example of a device in a network environment, not all examples of the disclosure are network devices. That is, some examples of the disclosure are capable of operating as connected devices that communicate with one or more networks, and some example of the disclosure are not capable of connecting to a network.

Illustrative Computing Device

Figure 2:
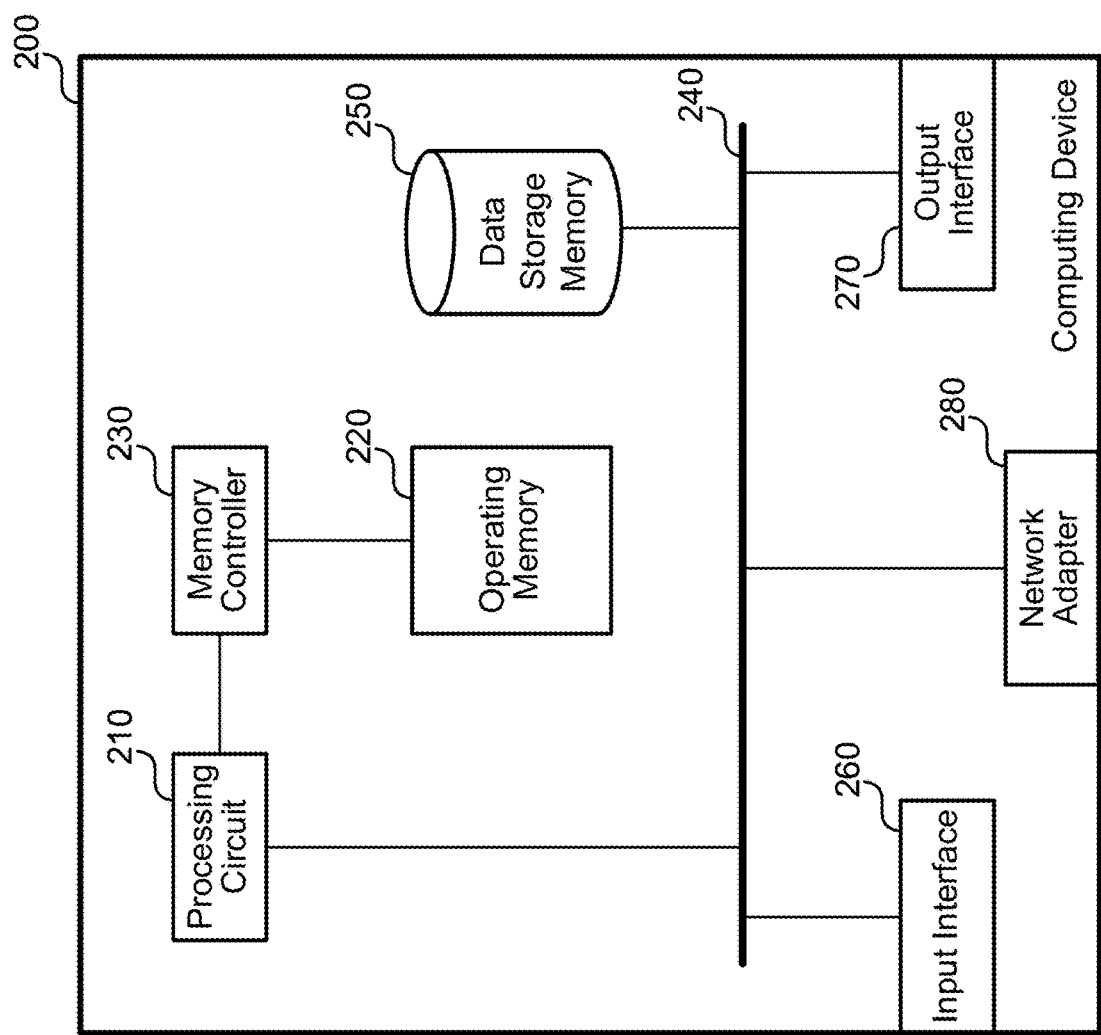
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device no or network node 120 of FIG. 1. Computing device 200 may also be an IoT device that connects to a network to receive IoT services. Likewise, computer device 200 may be an example any of the devices illustrated in or referred to in FIGS. 3-6, as discussed in greater detail below. As illustrated in FIG. 2, computing device 200 includes processing circuit 210, operating memory 220, memory controller 230, data storage memory 250, input interface 26o, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate ($DDR_4$) memory, $3^{rd}$ generation double data rate ($DDR_3$) memory, other dynamic random-access memory (DRAM), High Bandwidth Memory (HBM), Hybrid Memory Cube memory, 3D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media" (whether in the plural or singular form), throughout the specification and the claims, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I$_2$C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
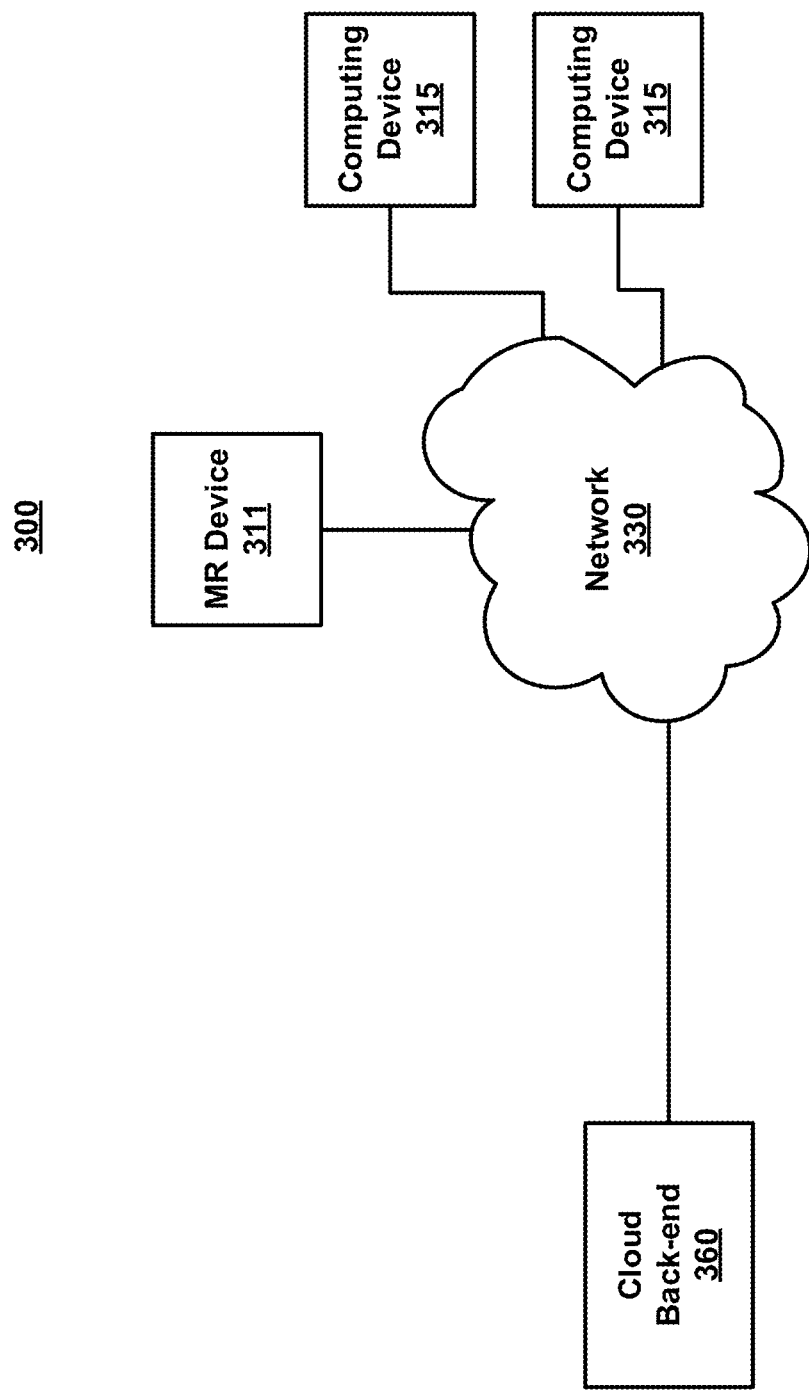
FIG. 3 is a block diagram illustrating an example of a system.

FIG. 3 is a block diagram illustrating an example of a system (300). System 300 may include network 330, as well MR device 311, computing devices 315, and cloud back-end 360, which may each connect to network 330.

MR device 311 and computing devices 315 may each include an example of computing device 200 of FIG. 2. Although two computing devices 315 are illustrated in FIG. 3, in various examples, there may be one computing device 315, three or more computing devices 315, and/or the like. Application back-end 360 refers to a device, or multiple devices such as a distributed system, that may assist in providing functionality to MR device 311 and/or computing device 315 via communication over network 330. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including $T_1$, $T_2$, $T_3$, and $T_4$, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some devices may be connected to a user device via a different network in network 330 than other devices. In essence, network 330 includes any communication technology by which information may travel between MR device 311, computing devices 315, and cloud back-end 360. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

Each computing device 315 may perform various functions in conjunction with MR device 311, and each computing device 315 may be capable of communicating over network 330 with MR device 311 and cloud back-end 360. As discussed in greater detail below, one of the computing devices 315 may be used to assist in the creation of guides for MR device 311, and/or the like.

MR device 311 may include any suitable MR device such as a wearable mixed-reality device. Some examples of MR device 311 may be a head-mounted display unit connected to an adjustable inner headband. Some examples of MR device 311 may include a self-contained holographic computer that enables a user to engage with digital content and interact with holograms while simultaneously viewing the real world. Some examples of MR device 311 may include cameras, processors, lenses, 3D audio speakers, a battery, and various specialized components such as multiple sensors, advanced optics, and a custom holographic processing unit. Some examples of MR device 311 may include physical buttons on the side which may be pressed to actuate various functions.

Some examples of MR device 311 may communicate with cloud back-end 360 to provide certain functions associated with MR device 311. Other examples of MR device 311 provide full functionality within MR device 311 without requiring communication with cloud back-end 360, and cloud back-end 360 is not included in system 30o in some examples. In some examples, MR device 311 is network-connected, and in other examples, MR device 311 is not network-connected.

MR device 311 may allow a user to simultaneously view the real world and virtual objects. The user may also be able to manipulate the virtual objects in various ways. The user may also be able to view applications in the mixed-reality view provided by MR device 311.

System 300 may include more or less devices than illustrated in FIG. 3, which is shown by way of example only.

Figure 4:
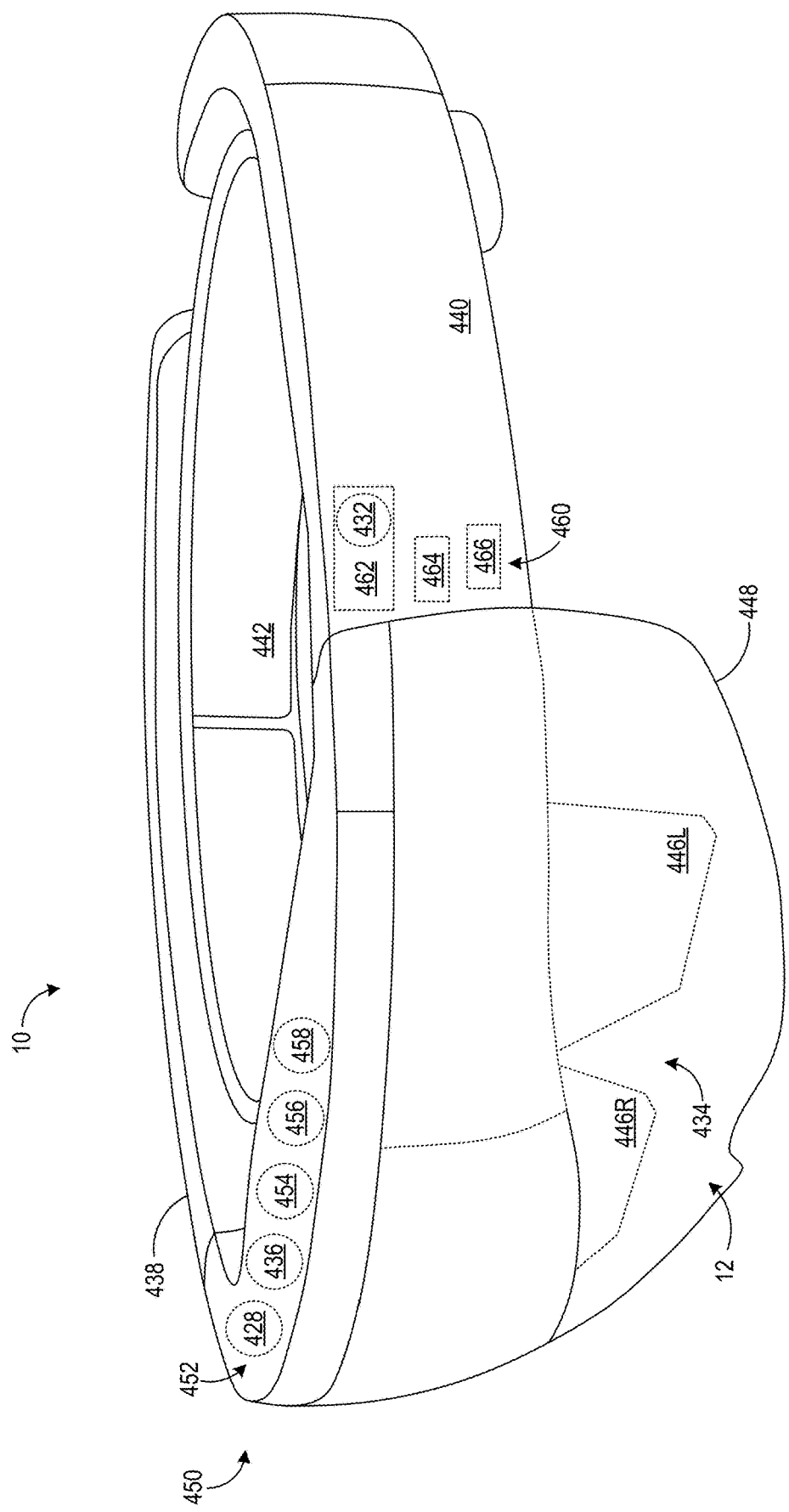
FIG. 4 is a diagram illustrating an example mixed-reality (MR) device.

FIG. 4 illustrates an example of computing device 10, which may be employed as an example of MR device 311 of FIG. 3 and/or computing device 200 of FIG. 2. In the example computing device 10 of FIG. 4, the computing device 10 is a head-mounted display (HMD) device. The illustrated computing device 10 takes the form of a wearable visor, but it will be appreciated that other forms are possible, such as glasses or goggles, among others. The computing device 10 may include a housing 438 including a band 440 and an inner band 442 to rest on a user's head. The display 12 of the computing device 10 may include the at least partially see-through display 434. The at least partially see-through display 434 may be a stereoscopic display and may include a left panel 446L and a right panel 446R as shown, or alternatively, a single panel of a suitable shape. The panels 446L, 446R are not limited to the shape shown and may be, for example, round, oval, square, or other shapes including lens-shaped. The computing device 10 may also include a shield 448 attached to a front portion 450 of the housing 438 of the computing device 10. The at least partially see-through display 434 and/or the shield 448 may include one or more regions that are transparent, opaque, or semi-transparent. Any of these portions may further be configured to change transparency by suitable means. As such, the computing device 10 may be suited for both augmented reality situations and virtual reality situations.

A controller 460 of the computing device 10 may include a logic subsystem 462, a storage subsystem 464, and a communication subsystem 466. The logic subsystem 462 may include one or more processors 432 configured to execute software instructions. A processor of the one or more processors 432 may an example of processing circuit 210 of FIG. 2, and the storage subsystem 464 may include an example of operating memory 220 of FIG. 2.

In some examples, the processor 432 of the computing device 10 is operatively coupled to the display panels 446R and 446L and to other display-system componentry. In some examples, the processor 432 includes logic and associated computer memory configured to provide image signals to the display panels 446R and 446L, to receive sensory signals from a sensor system 452, and to enact various control processes described herein. The sensor system 452 may include one or more location sensors 428, one or more optical sensors 436, a gaze detection system 454, one or more microphones 456, as well as one or more speakers 458. One or more optical sensors 436 may include one or more cameras. The processor 432 may be further configured to provide signals to the sensor system 452.

Display 12 may be configured to display holograms superimposed on a physical environment. Display 12 may be a stereo display that is at least partially see-through, and the hologram may be positioned to appear at a desired depth and position within the user's field of view. Alternatively, in some examples, display 12 includes a display of a portable camera-equipped computing device and the image may be superimposed on an image of the physical environment captured by the camera. In some examples, the processor 432 is configured to store a representation of the physical environment 30 in non-volatile memory 16. The processor 432 may be configured to generate the representation of the physical environment based on inputs received from a sensor system 452.

In some examples, computing device 10 is a wearable device, such as goggles, and gaze detection system 454 tracks the gaze of the user by tracking the forehead of the user. In other examples, the gaze of the user is tracked by gaze detection system 454 in other suitable manners. For instance, in some examples, gaze detection system 454 can track the gaze of the user with eye tracking via cameras pointed at each eye of the user. Eye tracking enables cursor positioning just by looking, with no requirement for head movement.

In some examples, via computing device 10, a first hologram is caused to be displayed to an operator with a first gaze selection area that is associated with a first selectable option. In some examples, a gaze location that is associated with a gaze of the operator is evaluated. In some examples, responsive to the gaze location coinciding with the first gaze selection area of the first hologram, a first gaze dwell timer is begun. In some examples, a total duration of the first gaze dwell timer is adjusted based on the gaze location being in a specific portion of the first gaze selection area. In some examples, responsive to the gaze dwell timer finishing, the first selectable option is caused to be selected.

Figure 5:
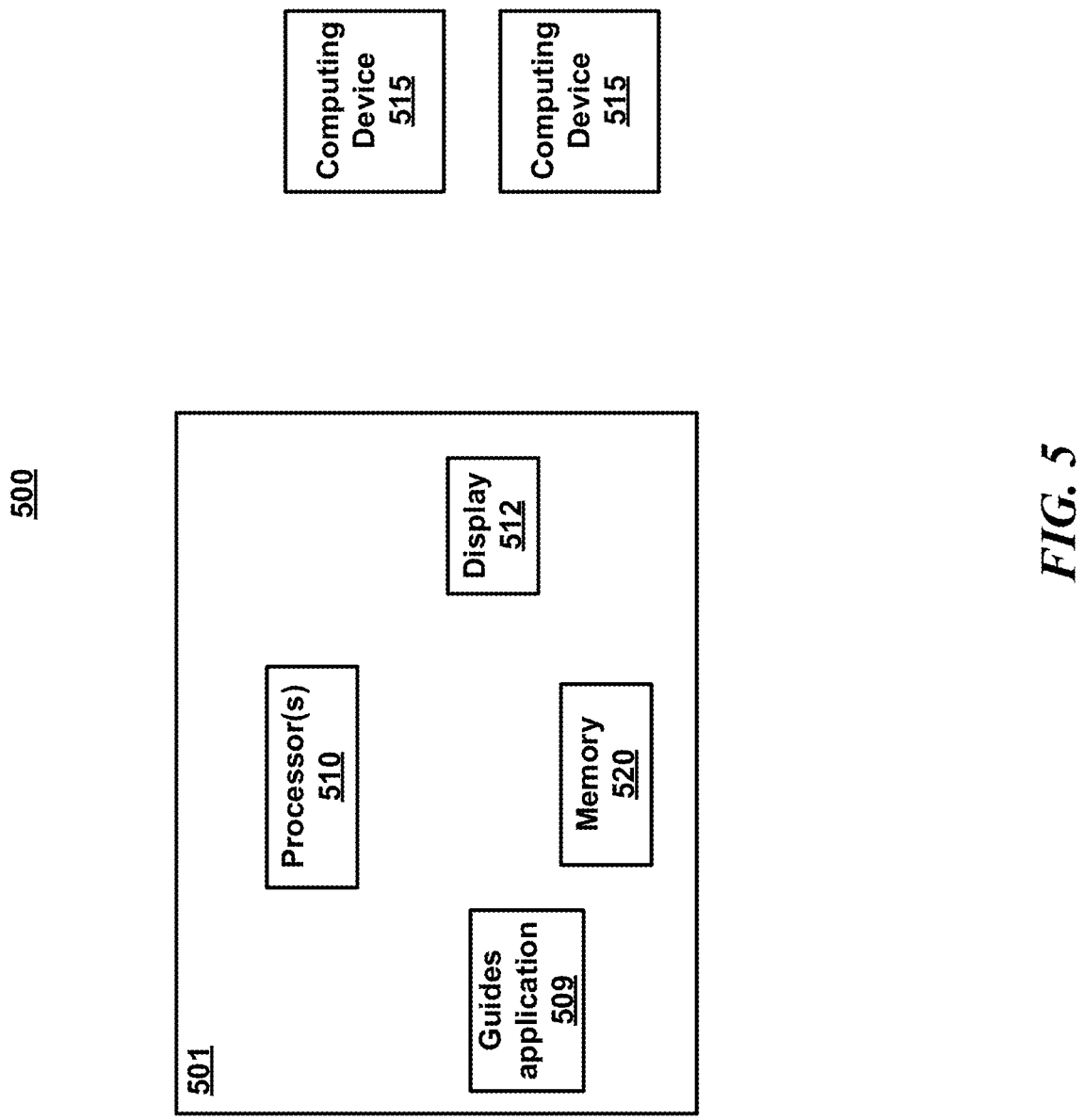
FIG. 5 is a diagram illustrating another example system including a hologram device.

FIG. 5 illustrates an example system (500) including hologram device 501 and computing devices 515. Each of the computing devices 515 may be an example of computing device 200 of FIG. 2 and/or one of the computing devices 110 of FIG. 1. Although two computing devices 515 are illustrated in FIG. 5, in various examples, there may be one computing device 515, three or more computing devices 515, and/or the like. In some examples, hologram device 501 is a computing device that, among other things, provides means for a user to view and interact with holograms. Hologram device 501 may, for instance, be a device such as MR device 311 of FIG. 3 or computing device 10 of FIG. 4, a virtual reality device, an augmented reality device, or any other suitable device that provides means for a user to view and interact with holograms, among other functions that hologram device 501 may provide. Hologram device 501 may be an example of computing device 200 of FIG. 2, MR device 311 of FIG. 3, and/or computing device 10 of FIG. 4.

Hologram device 501 may include one or more processors 510, operating memory 520, display 512, and guides application 509. One or more processors 510 may be configured to execute instructions, such as instructions for implementing the herein-described workloads, processes, or technology. The instructions may include guide application 509, and may further include other applications, such as applications that enable an operator to interact with one or more holograms in a mixed-reality view, augmented-reality view, or virtual-reality view. The aforementioned instructions, along with other data (e.g., datasets, metadata, operating system instructions, etc.), may be stored in operating memory 520 during run-time of hologram device 501. Display 512 may be configured to display holograms to a user of hologram device 501. In some examples, hologram device 501 is a head-mounted display mixed-reality device, or other wearable mixed-reality device, augmented-reality device, or virtual-reality device.

Many aspects of hologram device 501 are discussed below that may be used in conjunction with each other, or separately. That is, some examples may include all of the aspects of hologram device 501 discussed below, some examples may include but one of the aspects of hologram device 501 discussed below, and some example may include some, but not all, of the aspects of hologram device 501 discussed below.

Further, while many aspects of hologram device 501 are discussed in the context of guides application 509, the aspects are not limited to use with guides application 509, and may be applied to various functions provided by hologram device 501 outside of guides application 509. Some examples of hologram device 501 do not include guides application 509, and various of the aspects may be used by hologram device 501 even though hologram device 501 does not include guides application 509. Each computing device 515 may perform various functions in conjunction with guides application 509, such as the authoring and editing of guides, and/or the like. Many aspects of hologram device 501 may include interaction with holograms, including interaction with one or more holograms in conjunction with guides application 509, and interaction with one or more holograms in contexts other than guides applications, such as with one or more applications other than guides application 509 in which a user interacts with holograms in a mixed-reality view, augmented-reality view, virtual-reality view, or the like. Such interactions may include the selection of selectable options, which may include selectable buttons.

An operator may wear hologram device 501, which may provide the operator with a mixed-reality view, augmented-reality view, virtual-reality view, or the like, via display 512. Hologram device 501 may include holograms in the view, where the holograms may include selectable buttons. The buttons may be selected by the gaze of the operator, and in some examples may also be selected by other means, such as gestures, voice, and/or the like. Besides buttons, other various examples may include other selection options that may be selected via gaze, such as, for example, an app, menu, button, rotation handle, and/or the like.

The gaze of the operator in the environment may be indicated in some manner, such as via a visual cursor that shows the location of the operator's gaze in the environment. To select a button or a hologram via gaze, the operator may move the operator's gaze to the selection area of the button or hologram. The selection area of a button may be the entire button, a specific subset of the button, or another suitable area designated for selection of the corresponding selectable option.

As discussed above, the operator's gaze may be tracked in different ways in different examples. For instance, as discussed above, in some examples, gaze may be tracked by tracking the operator's forehead. Also, as discussed above, in some examples, gaze may be tracked based on eye tracking via cameras pointed at each of the operator's eyes.

In some examples, when the operator's gaze enters a selection area, a gaze dwell timer associated with the selectable option that corresponds to the entered selection area begins. For example, the gaze dwell timer may be two seconds by default in some examples. In other examples, other suitable durations for the gaze dwell timer may be employed. In some examples, responsive to the operator's gaze remaining in the selection area for the entire duration of the gaze dwell timer, the corresponding selectable option becomes selected. For example, the button may be considered pressed, clicked, or otherwise selected.

Responsive to the operator's gaze leaving the selection area prior to the expiration of the timer, in some examples, the gaze dweller timer is turned off and reset, to begin anew should the operator's gaze enter the selection area again. In some examples, visual and/or auditory indications of a gaze selection in progress may be provided to the operator, along with a visual and/or auditory indication when the selection is complete. For example, a click sound may occur when the selection is complete.

In this way, and as further explained above and below, in various examples, UI interfaces provide the operator with feedback as to the duration of gaze and how much time is left for a selection action via gaze to be completed.

In some examples, there may be a collision zone around the button. The collision zone is an invisible area around the button in some examples. In some examples, when a gaze dwell selection is in progress, if the operator's gaze leaves the button and enters the collision zone around the button, the selection in progress will not stop immediately as long as the operator's gaze does not leave the area defined by the collision zone and the selection area, or remain in the collision zone for too long. In some examples, responsive to the operator hovering in the collision zone for a prolonged period of time, a tool tip for voice commands is caused to appear.

In some examples, the selection in progress is not considered to begin immediately upon the operator's gaze entering the selection area. For example, when the operator's gaze first enters the selection area, the gaze dwell timer may begin, but the gaze may be considered hovering over the selection area, with no visual or auditory indication of a selection in progress being made when the operator's gaze first enters the selection area. However, in some examples, when the gaze dwell timer reaches a particular point, such as halfway to expiration, a selection in progress may be indicated, with the corresponding visual and auditory indications being provided. By not indicating a selection in progress immediately upon the operator's gaze entering a selection area in these examples, the operator need not be distracted or annoyed by a selection beginning when the operator's gaze is merely moving through the selection area on the way to some other location, or happens to be momentarily hovering in the selection area for some other reason.

In some examples, the operator may be able to adjust the duration of the gaze dwell timer, and thus the speed of gaze dwell selections may be adjusted the operator. For instance, in some example, there may be many operator-selectable settings that may be accessed via a menu and adjusted by the operator, and the operator-selectable settings may include a Gaze Fill Navigation Speed setting with a slider control that allows the operator to adjust the Gaze Fill Navigation Speed.

Selections via gaze dwelling may be used with hologram device 501 in a variety of different contexts. One particular context in which the selection via gaze dwelling may be used in some examples is with guides application 509.

Guides application 509, responsive to execution in hologram device 501, may be a mixed-reality application that provides guidance with real world activities via holograms. For instance, in some examples, guides application 509 may provide holographic instructions when and where they are needed. This may be used to enable an operator to receive step-by-step instructions on new tasks, may act as a checklist for a task that is familiar to the operator, or the like. In some examples, each task is divided into steps. While performing the task using guides application 509, for each step of the task, a holographic step card may be provided to the operator as part of the mixed reality view, where the step card may include an instruction for the current step of the task. The holographic step card may be a two-dimensional hologram or a three-dimensional hologram. The mixed-reality view may also include a tether that connects the step card for the current step of the task to a tether location for the current step of the task.

In various example applications for which hologram device 501 is used, a visual tether is used to connect to a tether location, which is a real-world location at which work is to be performed, at which part of the task is to be performed, or at which some similar step or action is to be performed. A digital object may also exist at the tether location. In some examples, the visual tether connects from the step card to the tether location, where the instruction on the step card is associated with something to be done at the tether location. In some examples, the tether is a holographic dashed white line that connects the step card to the tether location. In these examples, although the tether is a line, the line is typically curved. In some examples, the operator of hologram device 501 can read the instruction on the step card, and then follow the tether from the step card to the tether location. The operator may also use the tether by following the tether to return to the tether location at any time, for example, after the user's attention is distracted. The tether location may also include a 3D hologram associated with the work, task, action, or step that the user is to perform at the tether location.

The step card may include various buttons that the user can activate to perform various functions. For instance, in some examples, the user may be able to use the step card to navigate through various steps of the task, such as through a next step button, a go back button, and other means. The step card may also in some way indicate which step the user is currently on. The step card may include one or more buttons to turn on and off media associated with the step card, such as pictures or video that may assist the operator in performing the step. The step card may include a button to pin or unpin the step card to a particular location. The step card may follow the user's gaze to an extent while unpinned, as discussed in greater detail below. Various options and commands for the step card may be actuated by gaze dwell, as discussed above and below. Besides being activated by gaze, in some examples, various options and commands for the step card may be selected in different ways in different examples, such as through gestures and/or voice commands, as discussed in greater detail below.

In some examples, guides application 509 may enable increased productivity in a workforce by enabling the workforce to learn while doing their work. For instance, some examples of guides application 509 enable employees to learn in the flow of work by providing holographic instructions when and where they need them. Guides application 509 may be used in a variety of different contexts, including performing an operation, such as assembly in a manufacturing setting as but one example. In some examples, step cards act as a series of step-by-step instruction cards with image and video support, where each step card is visually tethered to the tether location for the step, the real-world place where the work needs to be done for the step. In some examples, additional guidance in the form of holographic models shows what needs to be done where, so workers can get the job done faster, with fewer errors and greater retention of learned skills, and help reduce the cognitive load of workers.

Guides application 509 may provide authoring tools for the creation and adding of guides to be subsequently used by used to complete the process for which the authored guide provides guidance. In some examples, work processes are captured using the authoring tool to create guides, which, in some examples, are files that include step-by-step instructions with images, video, and/or 3D holograms.

In some examples, the authoring tools may be used to create or partially create the guides on one of the computing devices 515, which may be a device separate from hologram device 501, and then the guides can be transferred to hologram device 501, to complete the guides, and for subsequent use of the guides by operators. In some examples, an author can use the author tools to create a guide on one of the computing devices 515, which may be a personal computer or other computing device. Using the author tools, in some examples, an author can begin authoring a guide using the author tools on one of the computing devices 515, transfer the guide to hologram device 501, and then, using guide application 509 via hologram device 501, connect the step cards and holograms to the physical work space using hologram device 501 by simply picking up and moving the step cards and holograms to the correct locations. In some examples, files, including the guide, are synchronized across several devices, including computing device 515 and hologram device 501, so that, rather than explicitly transferring the file from computing device 515 to hologram device 501, the guide will also be present on hologram device 501 via the file synchronization.

Guides application 509 may enable an improved training system. Typically, training occurs away from the flow of work in a training facility, and then requires a buddy system with experienced mentors to bring workers up to speed. Typically, some complex procedures are not needed regularly, and just-in-time training is needed. Typically, task cards and standard operating procedures are on paper or a 2D device that requires an operator to read, process, and then do.

In contrast, guides application 509 may enable operators to learn a task or be informed of updated instructions while in the flow of work. Guides application 509 may be used for complex procedures on the job or while training away from the production line, providing heads-up, hands-free, step-by-step instruction in the flow of work. Guides application 509 may enable operators to control the interface with their gaze—for example, using a glance to move to the next step—leaving their hands free to do the work. Various selectable options of the interface may be selected by gaze dwell, as discussed above and below.

In some examples, step cards move with the worker, following them as they move around equipment, pointing to the tools and parts they need and showing them exactly how and where to apply them. In some examples, the experience is comfortable, simple to use, and may reduce mental processing time, errors, and the need to rely on a buddy system. In some examples, using a guide via guides application 509, an operator can confidently work through steps of the associated process using a reliably anchored and ergonomic interface.

In some examples, a user may use a holographic guide via guides application 509 using hologram device 501 as follows. In some examples, the user may first calibrate hologram device 501. The calibration may be used to ensure that holograms are properly aligned to the environment. For instance, a guide might be used to assemble a door in a commercial aircraft. Without proper calibration, a user might drill a hole in the wrong place or assemble the wrong part. In some examples, guides application 509 may include multiple applications, including a calibration application. In some examples, the calibration application may lead the user though the calibration process step by step. In some examples, the user's interpupillary distance (IPD) may be determined as part of the calibration, or the IPD may be set prior to the calibration.

In some examples, one or more of gaze, gestures, and/or voice commands may be used to navigate through a guide, including navigating through steps of a task of a guide, including navigation by selection of options via gaze dwell.

In some examples, a guide may be navigated by gazing at an item, where the item may be, for example, an app, menu, or button. In some examples, the user's gaze may be in the center of the user's view, and indicated via a visual indicator such as a cursor dot or the like. In some examples, dynamic cursors visuals may be used for the gaze cursor when suitable. For instance, in some examples, when the user's gaze is on a button, the gaze cursor is replaced with a spotlight effect on that button. In some examples, a spotlight effect may be used on the button, with the gaze cursor still displayed. In some cases, a user can select an item by gazing at a selection box. In some examples, as previously discussed, the select does not occur immediately; rather, a selection is made responsive to a user's gaze dwelling in the selection box. For instance, in some examples, as discussed above, when the user's gaze enters a selection box or other selection area, a dwell timer begins, and the selection is made if the user's gaze remains in the box for the entirety of the dwell timer.

In some examples, when the user's gaze enters the selection box (or other selection area) the selection box begins filling to indicate a select in progress, and the item is selected when the selection box is filled, which occurs if the gaze remains in the selection box for the entirety of the dwell timer, with the filling box providing the user with a visual display of the dwell timer. In some examples, the entire button is the selection box. In some examples, a sound is also provided while the box is being filled to indicate that a selection is in process. The sound may be a click in some examples. Selection of an item via gaze may be extremely helpful the user's hands are occupied with tools or parts. In some examples, when a selection box on the Step card is being filled, it is ensured that the Step card does not move.

In some examples, the dwell timer may vary depending on the location of the gaze in the selection box. For instance, in some examples, the dwell timer may be longer, thus providing a slower selection, if the user's gaze dwells on the left portion of the selection box, and the dwell timer may be shorter, thus providing a faster selection, if the user's gaze dwells on the right portion of the selection box. In some examples, the difference in speed is also indicated to the user by the speed that the box is filling, as well as by changing the sound that occurs depending on the speed of the selection—for instance, in some examples, the intensity, feeling, and/or the like of the sound may vary based on the selection speed, in order to provide instant sonic feedback to the user as to the speed of the selection in progress.

In some examples, a user may use gaze to target an object, and then act on the target with a gesture. In some examples, a bloom gesture may be used to open or close a predetermined menu, such as the high-level menu for a guide. In these examples, when a user is uncertain of what to do, the bloom gesture may be a good way for the user to get oriented. In one example, to do the bloom gesture, the user will hold out the user's hand with the user's palm up and fingertips together, and then the user opens the user's hand.

In some examples, as discussed above, an app or other hologram may be selected in multiple ways, including with a gesture. In some examples, the air tap gesture may be used to open a hologram. In some examples, a user may select a hologram with an air tap by gazing at a hologram, holding the user's hand straight in front of the user in a loose fist, and then pointing the user's index finger straight up toward the ceiling, then tapping the user's finger down, and then quickly raising the user's index finger back up again.

In some examples, a user can interact with the holographic environment in different ways, which may vary based on user preferences, or based on the particular circumstances. For example, in some circumstances, a user's hands may not be free to perform gestures, and in some circumstances, the environment be too noisy for voice commands. For instance, in some examples, to perform a selection, a user may use an air tap gesture, may use a voice command (such as saying "select"), or may select with gaze (such as by moving the user's gaze to the corresponding selection box and leaving it there until the selection box if filled). In some examples, a user may say "Next step" to go to the next step, as an alternative to selecting the "next step" button. In some examples, selectable buttons may also include an indication of the voice command that may be used to select the button. For instance, in some examples, the "Next Step" button includes text at the bottom of the Next Step button that says, "Say 'Next Step.'"

In some examples, the body of the guide is designed in such a way that minimizes chance of the user accidentally activating something with the user's gaze, or of feeling overwhelmed that the user's gaze may cause an unintentional selection. The phenomenon of the user being potentially overwhelmed that the user's gaze may cause unintentional selection of elements in the user's view everywhere the users looks, feeling somewhat like an out-of-control pinball machine, may be referred to as "gaze as a weapon." Various examples of the disclosure seek to prevent the user from experiencing the "gaze as a weapon" effect.

For instance, in some examples, when the user selects the button to go to the next step or the previous step, there is no button in the same location on the next or previous step. For example, if the "Next" button were in the same position for two consecutive step cards, the user might unintentionally skip past the next intended step. Instead, in some examples, the design ensures that there is no next button, or any other selectable button, at the location of the next step card after the next button is selected.

Further, in some examples, the design ensures that certain pathways are clear of buttons. For instance, in some examples, there is a safety zone in the body of the guide, where elements of the guide are spread out sufficiently such that accidental selections are not made. In some examples, the design ensures that there are no buttons that might be unintentionally selected in the places that are user would typically move the user's head. In some examples, clear pathways for gaze are used for common selections. For instance, in some examples, there are no buttons between frequent expected gaze patterns, such as between Next and Back, since, in some examples, the operators looks back and forth between Next and Back more frequently than other buttons. In some examples, the path downward from the instructions on the step card towards the area where the work is happening is kept clear, because an operator is expected to frequently look at instructions, and then down at the work.

In some examples, an operator of hologram device 501 may begin using hologram device 501 to perform tasks by first calibrating hologram device 501, and then opening a guide. In some examples, once a guide is open, the guide first contains alignment instructions. The operator may then align the guide by following the alignment instructions. Aligning the guide may be used to ensure that the holographic instructions line up with the real-world environment. In some examples, some guides may include a marker alignment, which uses a hologram marker that looks just like a printer marker that is in the real-world environment. In some examples, the operator aligns the guide by finding the printed marker in the real-world environment, aligning the hologram marker with the printed marker, and then confirming the alignment.

In some examples, the alignment may be accomplished with a manual alignment rather than a marker alignment. In some examples, to perform manual alignment, the operator uses a gesture to align the guide to a digital 3D representation laid over a physical object in the work area. For instance, in some examples, if the author of the guide chose manual alignment when the author created the guide, the operator would align a hologram with a digital 3D representation of the same object in the real world.

In some examples, after an operator opens a guide, and performs alignment, if necessary, the operator will then see the first Step card of the guide that is provided as a hologram as part of the mixed-reality view. In some examples, the Step cards provides the instructions that an operator follows to complete a task. In some examples, the Step card also includes, among other buttons, two buttons used to navigate through a guide—the Next Step and Go Back buttons. In some examples, these buttons, and others, can be selected via gaze dwell, gesture, or voice command. In some examples, once an operator completes a step, the operator can select the Next Step button to go to the next step, and so on, until all of the steps in the guide are completed. In some examples, each step has a corresponding Step card that includes one or more instructions for that step. In some examples, as the operator goes through the steps in a task, the Step card "tags along" with the operator via hologram device 501 to keep the instructions in a location that is useful to the operator.

In some examples, in addition to the Next Step and Go Back buttons, the Step card includes a number of different buttons and user interface (UI) elements to help the operator take various actions.

In some examples, the Step card includes a Task/Guide progress bar. In some examples, the Task/Guide progress bar indicates where the operator is within a task, and within the entire guide. In some examples, the operator can leave a task midway (by using the bloom gesture) and come back to the same position in the guide during a run. In some examples, progress is saved during this step and the operator can start from where the operator left off, unless the operator closed the application.

One example of a description of the buttons and other UI elements on the Step card are as follows, with some of the function discussed in more detail elsewhere:

| Button or UI element | Description |
| --- | --- |
| Home | Choose a different guide |
| Settings | Access to settings. |
| Profile | Sign in and out. |
| Alignment | Realign your guide. Hologram device 501 may sometimes lose tracking, which causes holograms to be misaligned. To fix this, you can realign the guide by gazing at a printed marker or digital 3D representation again. |
| Pin | Lock the Step card in place. This is useful if you want to keep the Step card in one location while you complete the step or task. |
| Outline | Go to the Outline. Use the Outline to quickly navigate around your guide. |
| Task/Guide progress | Shows where you are within a task, and within the entire guide. |
| Media | Close the image or video associated with the step. (If there's an image or video associated with a step, it appears automatically when you go to that step.) |

In some examples, Step cards are linked by holographic tethers to physical areas in the work area. In some examples, a tether is a holographic link that ties a step visually to an area, object, or the like that is relevant to the step. A tether may help the operator find the area where the operator needs to take an action. In some examples, the tether is a holographic dashed white line leading from the step card to an area, object, or the like that pertains to the step indicated on the Step card. The operator may follow the tether to find the physical area where the operator needs to do the work, and then, once the work is completed, or when the operator needs to refer back to the step, follow the tether back to the Step card to read the instructions. If the tether points behind the operator, then the operator may step to the side and then continue to follow the tether.

In various examples, the tether location may be a fixed location in the real-world, at which a 3D hologram may exist, or the tether location may be the location of the 3D hologram, where the hologram is situated meaningfully in the real world, such that if the 3D hologram is moved, the tether location is moved accordingly. In this way, in these examples, the tether location may be a fixed real-world location or a meaningful spatially situated instruction hologram such as an arrow, zone, or 3D computer-aided design (CAD) file overlaid on top of a real physical object.

In some examples, the tether serves to tether instructions to the real world. In this way, in these examples, an operator may follow the tether in order to look at what the instructions are referring to in the real world. Instructions may also be useful if an operator returns to the task—the operator may follow the tether to return to a work area. The tether may link the Step card to the tether location—the real-world location at which work is to be performed for the step. There may also be a three-dimensional hologram at the tether location. For instance, if a part is to be installed in a machine during the step, the tether may connect the step card to the location where the part is to be installed, with, at the location, a three-dimensional hologram of the part that is to be installed, as the part will appear once the part has been installed.

In some examples, the tether includes a dynamic button system on the tether itself. In some examples, the dynamic button system on the tether includes quick shortcut buttons that provide quick shortcuts to common functions associated with guides application 509. In some examples, the quick shortcut buttons on the tether are selectable by gaze dwell. In some examples, this may be useful because the tether connects the instructions to where the work takes places, and thus the operator is typically looking at the end of the tether while working. In some examples, the tether may move around based on where the operator is working, and accordingly, the quick shortcut buttons on the tether are moving with the area in which the operator is working. In this way, the quick shortcut buttons may constantly be nearby where the operator is working without getting in the way of the operator. An operator can, accordingly, in some examples, use both hands while working and glance up comfortably at a tether shortcut button, and perform a quick-dwell to activate the selection, in order to quickly and easily activate a particular function.

In some examples, as default behavior, wherever the operator looks, the Step card follows the operator's gaze—that is, the Step card "tags along" with the operator's gaze. In this way, the operator does not have to worry about where the instructions are while working. In some examples, the Step card only follows the operator's gaze when the operator indicates significant intention to move to a new area. This may be accomplished in different ways in different examples. In some examples, the card does not move when the operator is in the process of selecting buttons on the card. In some examples, there is a safe zone around the card, which may, in some examples, be a pie shape or cone shape at a particular angle. In some examples, the safe zone is dynamically adjusted based on one or more factors. For instance, in some examples, the safe zone may be adjusted based on whether other content, such as media, is present.

In some examples, if the operator's gaze crosses the threshold of the safe zone, a timer is started. In some examples, if the operator's gaze remains outside of the safe zone for the duration of the timer, then the Step card moves to the new location of the operator's gaze. In one example the timer may be a two-second timer, and in other examples, other suitable durations for the timer may be used.

The gaze determination is not necessarily limited to the angle of the operator's gaze, but may also be based on other aspects of the operator's gaze and/or the operator's head movements. For example, the gaze determination is not necessarily limited to the spot at which the operator is gazing, but also to where the user's head is relative to the spot at which the operator is gazing. For example, if the operator's gaze moves to a lower position, the tag-along behavior of the card may vary depending on whether the user's head remained in the same position with the user looking downward at the lower spot, or whether instead the operator squatted down, keeping his gaze at the same angle but looking at a lower spot due to the operator's head being at a lower position. In some examples, the safe zone applies to tag-along behavior based on gaze, but not to determinations related to selections based on gaze dwell.

In some examples, certain rules are used for the Step card regardless of the Step card's movement. For instance, in some examples, the Step card is prevented from moving while a selection box on the Step card is filling as a result of gaze. In some examples, the instruction card is kept at a minimum forwards distance threshold from the operator. For instance, in some examples, the minimum forwards distance threshold may be the minimum focal distance away from the operator, such as at least 2.1 meters away from the operator according to one example. For instance, in some examples, if the operator moves closer to the Step card than the minimum forwards distance threshold, the Step card will move backward to maintain the minimum distance.

In some examples, the entire Step card is kept in the operator's view when appropriate. As discussed above, the Step card may be left out of the operator's view when the operator's gaze has moved but the operator has not indicated an intention to move the operator's view to a new area. In some examples, it is ensured that, whenever the Step card is out of the operator's view, wherever the operator looked last, it is ensured that the Step card is already be there where the operator looked last, or be moved into the operator's view after a short period of time responsive to the operator returning the user's view to the location where the operator looked last.

In some examples, if the operator moves backward, a determination will be made as to whether the instruction card is in the operator's view. If so, in these examples, a determination is made as to whether the distance from the operator to the Step card is greater than a particular threshold, such as 3.1 meters. If so, in these examples, the Step card is moved toward the operator so that that the Step card is a distance equal to the minimum forwards distance.

Some previous examples above involved a safe zone, that may be a cone shape or the like, in which a timer begins responsive to the operator's view leaving the safe zone, and in which the Step card moves into the operator's current view responsive to the operator's view remaining outside of the safe zone for a threshold period of time. However, in some examples, horizontal rotation and vertical rotation are treated differently. For instance, in some examples, responsive to the view of operator rotates horizontally more than a threshold number of degrees, a timer starts, and responsive to the view of the operator remaining beyond the threshold horizontal angle for a determined period of time, the Step card moves to the center of the user's view. In some examples, responsive to the operator's view rotating vertically by more than a vertical angle threshold, the horizontal angle threshold is deactivated.

In some examples, the threshold horizontal angle is 29.5 degrees, and the threshold vertical angle is 3 degrees. In some examples, the threshold angles may be fixed, and in other examples, the threshold angles may be dynamic. As discussed above, in some examples, the detected angle is determined not just based on a change of the gaze position, but also on head movement. For instance, some examples, if the user's gaze is on a lower position because the user squatted down, but the user is looking at the same angle, this does not count as a change in vertical angle of the user's view. In contrast, in these examples, if the user's head remains in the same position but the operator's gaze is on a lower spot, this counts as a change in the vertical angle of the user's view.

In some examples, responsive to the operator squatting more than a particular distance such that the user's gaze is in a correspondingly lower position, a timer begins. In some examples, responsive to a particular time expiring with the operator still so squatting, the Step card moves to the new position of the user's gaze. In some examples, the timer for squatting is different than the timer for horizonal location. The thresholds for squatting, including the squatting distance and the timer, may be fixed or dynamic in various examples.

In some examples, the operator can pin the Step card to turn off the tag-along feature, so that the Step card will not follow the operator's gaze while the Step card is pinned. In some examples, to pin the Step card, the operator selects the Pin button. In some examples, the pin action can be selected in various ways, such as selecting the Pin button by gaze dwell, selecting the Pin button by gesture, or selecting the Pin button by voice command. In some examples, once the Step card is pinned, the operator can grab the Step card and move the Step card. For instance, in some examples, the operator can move the Step card by using a tap-and-hold to place the Step card in a new location. In some examples, while the Step card is pinned, even though the Step card remains in the same location unless the operator selects and moves it, the Step card stays in the same location but rotates to face the operator.

In some examples, there is a command that can be used "beckon" or "summon" a pinned Step card to the operator's location. For instance, in some examples, if the operator says, "instructions," the step card will appear at the location of the operator's current gaze, even if the step card is pinned. In some examples, once pinned, the card remains in the same location, correlated to the real world, until there is an operator command to the contrary, such as an operator command to beckon the card, to move the card, or to unpin the card. In some examples, no matter where the operator pins or beckons the instructions, the tether from the instructions to the corresponding real-world location remains tethered to the real-world location.

In some examples, the operator can turn holograms off (or turn them back on), for example if the operator feels like a hologram is getting in the way. In some examples, an operator can turn off a hologram by gazing at the "eye" in the middle of the tether.

Figure 6:
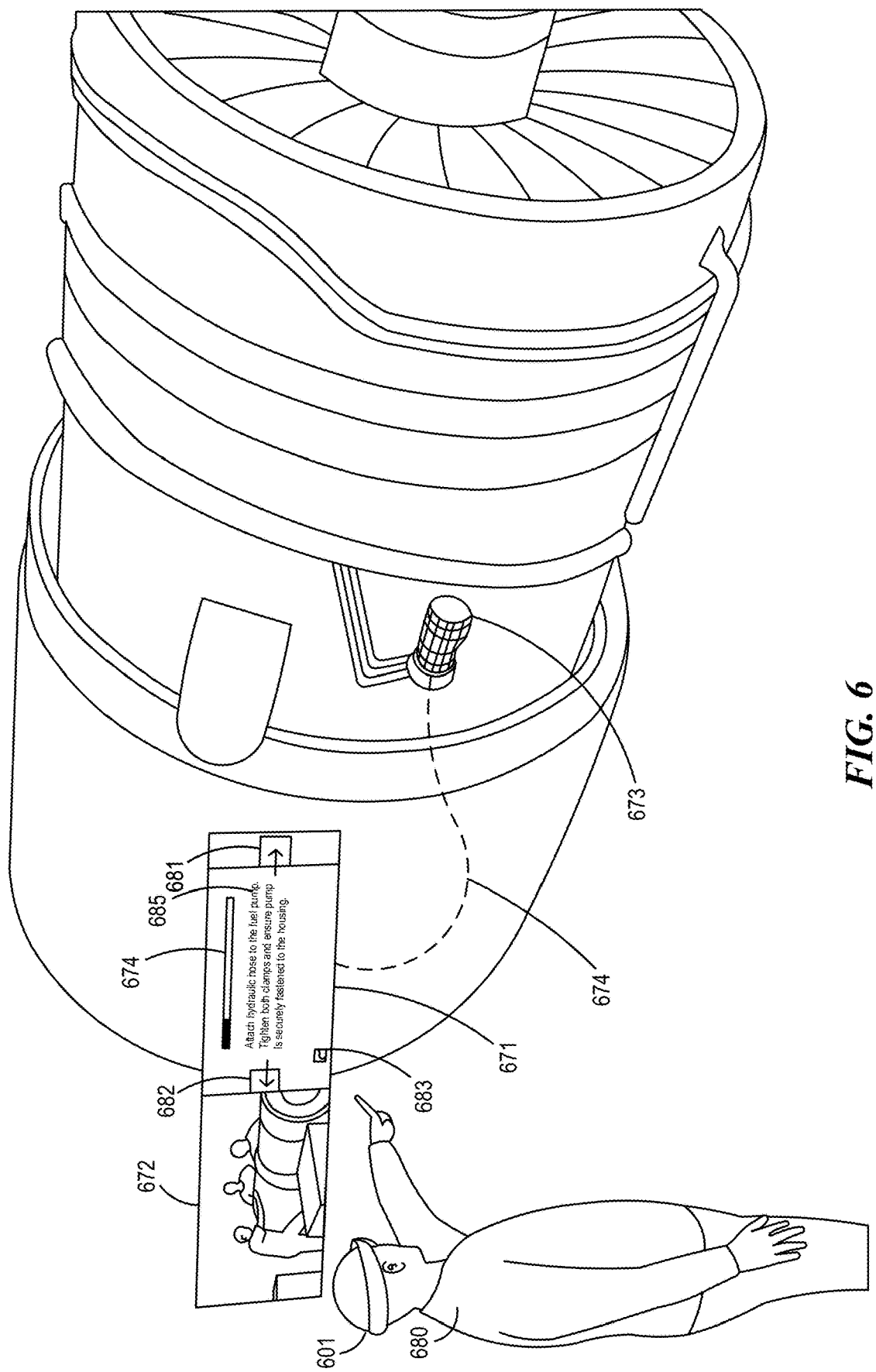
FIG. 6 is a diagram illustrating an example of an operator using an MR device.

One example of use of hologram device 501 is illustrated in FIG. 6. In the example illustrated in FIG. 6, an operator 68*o* is wearing mixed-reality (MR) device 601. Mixed-reality device 601 is an example of hologram device 501 that is a wearable, head-mounted display mixed-reality device. Via MR device 601, in the example illustrated in FIG. 6, the operator can see step card 671, picture 672, 3D hologram 673, and tether 674, all superimposed on a real-world environment. In some examples, tether 674 tethers step card 671 to the location in the real-world environment where work is to be performed for the current step. Step card 671 may include Next Step button 681, Go Back button 682, Media button 683, Task Progress bar 684, and instructions 685.

Next Step button 681 may be used to proceed to the next step in the task. Go Back button 682 may be used to go to the previous step in the task. Media button 683 may be used to toggle and off media, such as pictures, video, and/or other media present for the step. For the step illustrated in FIG. 6, media button 683 may be used to toggle on and off picture 672. In some examples, Next Step button 681, Back button 682, and Media button 683 are examples of buttons that can be selected by gaze dwell, voice command, and/or by gesture.

In some examples, task progress 684 indicates how far along the current step is in the task. FIG. 6 shows but one example of a step card, and other examples may include more or less buttons than shown in FIG. 6. For example, as discussed above, some examples of the step card may include a pin button that may be used to pin or unpin the step card. Instructions 685 are instructions associated with the current step of the task, which is related to 3D hologram 673 at the tether location, where tether 674 is connected between step card 671 and the tether location.

3D hologram 673 is an example of a three-dimensional hologram at the tether location, which is the real-world location where work is to be performed in the real-world environment for the current step in the task. As shown in FIG. 6 in accordance with one example, tether 674 is a visual tether from Step card 671 to the tether location.

Returning to FIG. 5, although guides provided by guides application 509 may be useful for relative beginners, one or more guides may also be useful to experts. For instance, an expert may benefit from turning off holograms and/or tethers, but still using a checklist. The checklist may be particularly useful, even for an expert, particularly for use with a complex task for which it is crucial not to miss any steps.

In some examples, the authoring of guides for guides application 509 may be accomplished with the use of two applications: one application on one of the computing devices 515, and guides application 509 in authoring mode. In some examples, an author may start with an application on one of the computing devices 515, using the application to create the guide, choose an alignment method, add tasks and steps, write the instructions for the steps, and assign different types of assets to support those steps. In some examples, these supporting assets may include: 3D parts; 3D objects, such as objects from the 3D toolkit (arrows and numbers, for example); 2D media (images and videos); and/or the like.

In some examples, after creating the guide on an application on computing device 515, the author may use guides application 509 on hologram device 501 in Authoring mode to test the flow of the guide, assign holographic tethers to show operators where to focus, place holograms in the real world, and add styles to 3D objects (such as a warning or caution, for example).

The author may also choose an alignment method for the guide. Alignment may refer to the process of gaining an understanding of the world around the user and accurately placing holographic instructions in relation to their work. In some examples, calibration takes into account the user's interpupillary distance (a number that varies across individuals) that further improves alignment. In some examples, if marker alignment is selected, the author attaches a printed marker to a physical object in the real world. In some examples, if manual alignment is selected, the user imports a 3D representation (such as a CAD model or scanned model), and then lays the representation directly over a physical object in the real world. Independent from the method used for alignment, the following additional factors may impact the accuracy of the alignment and/or user perception of the alignment: the Interpupillary distance (IPD) setting, pre-scanning the environment, and device positioning. The IPD is the distance between the center of the user's pupils, which may be set on hologram device 501, as discussed in greater detail above.

Pre-scanning the environment may be accomplished by hologram device 501 actively scanning its environment for visible features to create maps of its surroundings. In some examples, hologram device 501 pre-scans the environment whenever the hologram device 501 is turned on and a user is signed in to hologram deice 501. In some examples, hologram device 501 constantly improves the accuracy of these maps as it scans the environment from different viewpoints and stores them on the device. In some examples, holograms are placed in relation to these maps. In some examples, the more accurate the map, the more accurate the hologram placement.

In some examples, before using Guides on a hologram device 501 that is unfamiliar with its environment, the user may wish to put on hologram device 501, sign into hologram device 501, and walk around the space where hologram instructions are placed or will be placed. In some examples, walking at a leisurely pace while slowly looking up and down will give the device the opportunity to find features and construct accurate maps. In some examples, this only need be done once for each environment because hologram device 501 stores the maps it created on the hologram device 501.

In some examples, after selecting an alignment method, the author may use the Outline page, which may be used to create the framework for the guide by adding as many tasks and steps as needed. In some examples, tasks are groups of steps; steps are the short, discrete work items that operators do to complete the task; and steps are the central building blocks for guides. In some examples, a special step called a Completion step as the last step of the guide lets operators know when they've reached the end of the guide. In some examples, the tasks, and the steps for each task, are entered on the Outline page. In some examples, in addition to tasks and steps, the Outline page shows customizable operator instructions.

In some examples, steps can be created directly on the outline page, or from a Step card page. In some examples, in the Step card page, the author writes the instructional text and assigns supporting assets for that step, such 3D content or media (e.g., image, audio, and/or video). In some examples, when the author views the guide on hologram device 501 in Authoring mode, the author will be able to see all of the assets that are associated with the steps, and can then use the authoring mode place the assets in their relevant spaces in the real world. For instance, in some examples, if an author assigns a pointer to a step in the application on one of the computing devices 515, the author can subsequently align that pointer to the thing that the author wishes to point to in the authoring mode of guides application 509 of hologram device 501. The author may place one or more instances of 3d models in space.

In some examples, once the author has finished the creating all of the steps on the application of one of the computing devices 515, the author can then take the next major step to creating the guide on hologram device 501, in Authoring mode of guides application 509. In entering Authoring mode, the author may align the guide, test the flow of the guide, add holographic tethers to visually tie the steps to physical objects in the real world, place holographic 3D content in the relevant corresponding spaces in the real world, and may, if desired, add styles to 3D content to add treatments such as a warning or caution. In some examples, the author can add visual design, including color, size, style selection, and other tools, including the selection of the color and size of holograms.

After aligning the guide, the author may test the flow of the whole guide to see how the guide flows. As the author steps through the guide, the author may make note of things be changed in the guide. For example, as a result of stepping through the guide, the author may wish to move some steps around, add tasks or steps, or add more supporting assets, and the author may wish to make these changes on one of the computing devices 515 before starting to place holograms, tethers, and styles.

In some examples, the author may choose pre-determined locations for the step card, for each step while authoring, and the author may choose, if preferable based on the space, a particular position for the step card rather than the position being determined more dynamically, by using pre-determined pinning of the card for each step.

When placing holograms, the author may walk through each step in the guide and place any assets that the author associated with that step when it was authored on one of the computing devices 515. For example, if the author added a 3D part to support a step, the author may place that 3D part over the part's physical counterpart in the real world. If the author added a 3D object from the 3D toolkit (an arrow or a number, for example), the author may place that object in an appropriate place in the real world to draw the operator's focus. In some examples, the author can place the same 3D part or 3D object as many times as desired.

In some examples, no further actions are necessary with regard to associated media such as video or audio, which will automatically appear when the operator goes to the step. In some examples, the user can select the Media button to close the image, video, or other media.

In some examples, the 3D assets associated with each step appear below the Step card. In some examples, to place them in the real world, the author may manipulate holograms as discussed elsewhere, such as via gestures. Tethers may be placed in the real-world environment, for example via gestures. Similarly, styles may be applied to holograms.

Figure 7:
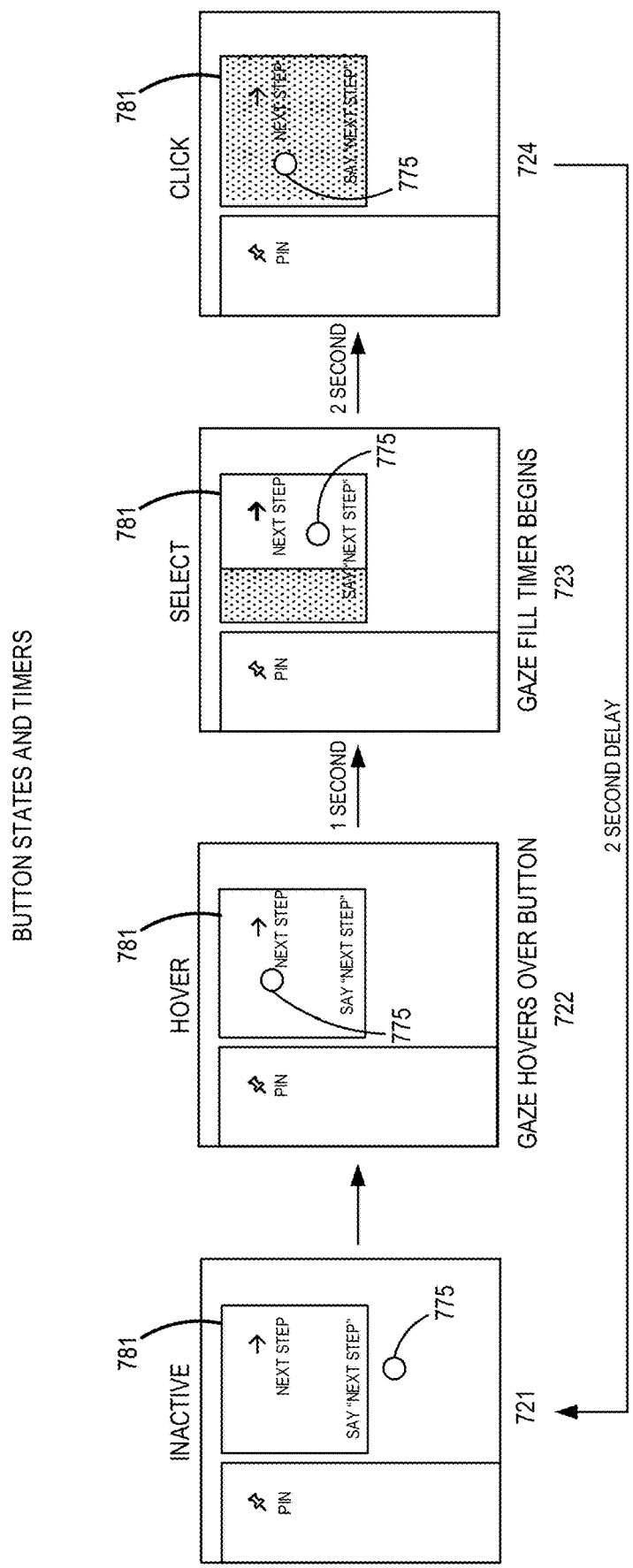
FIG. 7 is a diagram illustrating an example of a holographic button in an MR view that is selected based on gaze dwell.

FIG. 7 is a diagram illustrating an example of a holographic button in an MR view that is selected based on gaze dwell at times 721-724.

FIG. 7 at time 721 shows an example of Next Step button 781, which may be an example Next Step button 681 of FIG. 6, with a gaze cursor 775 near but below Next Step button 781. In some examples, gaze cursor 775 indicates the location of the operator's gaze. In the example show in FIG. 7 at time 721, Next Step button 781 is inactive because gaze cursor 775 is outside of Next Step button 781. Gaze cursor 775 is one example of a visual indication of the gaze location displayed to the operator.

FIG. 7 at time 722 shows an example of Next Step button 781 with gaze cursor 775 inside Next Step button 781. In some examples, when gaze cursor 775 enters Next Step button 781, the gaze dwell timer for Next Step button 781 begins. At this time, in some examples, gaze cursor 775 is considered to be hovering over Next Step button 781. When gaze cursor 775 is on Next Step button 781, the fact that gaze cursor 775 is on Next Step button 781 may be indicated with a visual indication. For instance, in some examples, as shown in the example illustrated in FIG. 7 at time 722, Next Step button 781 turns from black to grey when gaze cursor 775 is hovering over Next Step button 781. In other examples, other suitable visual indications may be employed.

FIG. 7 at time 723 shows an example of Next Step button 781 after gaze cursor 775 has entered Next Step button 781 and remained there for a particular portion of the gaze dwell timer, such as half of the gaze dwell timer in some examples, thus initiating a select-in-progress of Next Step button 781. In some examples, the gaze dwell timer is two seconds, and the select-in-progress begins when the gaze dwell timer reaches one second.

When there is a select-in-progress of Next Step button 781, as shown in FIG. 7 at time 723, the select-in-progress may be indicated visually and auditorily. In some examples, the select-in-progress may be indicated by a visual fill of Next Step button 781, as shown in FIG. 7 at time 723. In some examples, the fill may a horizontal fill that begins from the left-hand side of Next Step button 781, in a different color than Next Step button 781 itself, proceeding from left-to-right, with the percentage of Next Step button 781 filled indicating the percentage toward completion of the select-in-progress. In the example shown in FIG. 7, the entire area of Next Step button 781 is the gaze selection area corresponding to the selection of the selectable option "Next Step."

FIG. 7 at time 724 shows an example of Next Step button 781 after gaze cursor 775 has remained in Next Step button 781 through expiration of the gaze dwell timer. At this point, in some examples, the fill completely covers Next Step button 781, which may act as a visual indication of the selection being completed, and an auditory indication that selection is complete, such as a click sound, may also occur. At this point, in some examples, Next Step button 781 has been selected/clicked, and the next instruction card in sequence for the current guide is then provided in response to Next Step button 781 being selected.

In the example illustrated in FIG. 7, gaze cursor 775 remains within Next Step button 781 for the entirely of the gaze dwell timer. In some examples, if instead gaze cursor 775 had left the area of Next Step button 781 prior to expiration of the gaze dwell timer, the gaze dwell timer would stop and reset, to begin anew from the start if gaze cursor 775 were to enter the area of Next Step button 781 again. In this way, in some examples, when gaze cursor 775 leaves the area of Next Step button 781, the select-in-progress is stopped, to begin anew from the start if gaze cursor 775 enters the area of Next Step button 781 again.

Although not shown in FIG. 7, as discussed above, the time on the gaze dwell timer, and thus the speed of the select-in-progress, may be adjustable, such as by where the operator looks within the gaze selection area. For instance, in some examples, the gaze selection area may be divided into three portions—a left section of the area, which causes the select-in-progress to be made at a lower speed, a middle section of the area, which causes the select-in-progress to be made at the standard speed, and a right section of the area, which causes the select-in-progress to be made at a faster speed.

Also, in some examples, the further to the left while still in the selection area, the slower the select-in-progress, and the farther to the right, while still in the selection area, the faster the select-in-progress. For example, the speed of the select-in-progress may be adjusted by adjusting the total duration of the corresponding gaze dwell timer accordingly. A sound may accompany the select in progress, with the nature of the sound providing feedback as to the current speed of the select-in-progress. The speed of the fill of the selection area may also provide feedback as to the speed of the select-in-progress. The percent of the selection area which is filled may be used to represent the percent of the selection in progress complete, so that a faster select in progress is shown visually by a faster fill, and a slower select in progress is shown visually by a slower fill. In this way, in some examples, the UI interface allows the user to accelerate or decelerate a gaze-only selection.

Using left-right portions of the selection area is but one example of how the user may adjust the speed of the select-in-progress based on gaze dwell based on the portion of the selection area that the gaze is within. Adjusting the speed of the select-in-progress based on gaze dwell based on the portion of the selection area that the gaze is within may be accomplished in other suitable ways in other examples.

In some examples, audio feedback is used in conjunction with a gaze dwell selection in progress in such a way as to aid the operator in understanding the gaze dwell selection in progress. In some examples, a sound may occur during the selection in progress, and the sound may dynamically change during the gaze dwell selection in progress based on changes occurring in the gaze dwell selection, in such a way as to help trigger mental understanding of the operator of the progress of the gaze dwell selection in progress. For instance, in some examples, the sound changes based on how close the cursor is to center of button, based on how long the gaze has been on the button, and/or the like. In various examples, the sound change may be a change in volume, pitch, depth, number of tones over time, and/or the like.

For instance, in some examples, the sound may increase in volume, pitch, depth, or number of tones over time the longer the operator's gaze remains on the button, as an indication of progress. In some examples, the sound may decrease in volume, pitch, depth, or number of tones over time if the user's gaze moves away from the button prior to activation of the button, to confirm deactivation of the selection to the operator. In this way, in some examples, audio-visual fusion may be employed so that what the operator sees and/or hears work together to communicate a new way of interacting with computers.

The visual fill indicating the select-in-progress on the button or other gaze selection area may also be indicated visually in different ways in different examples. For examples, the fill may be show as a thin bar fill, full button fill, radial fill, linear fill, matte fill, vertical fill, horizontal fill, edge fill, tab fill, based on gaze fill target zones, and/or the like in various examples. The buttons may be of various shapes, and the gaze selection area may be the buttons themselves, or some other suitable gaze selection area.

For example, a radial fill may begin filling as a dot, for example beginning in the center of the button or in the cursor position, and fill outward as an enlarging circle or other shape. In some examples, only portions of the circle that are inside the button fill, with the fill being complete when the button is completely filled.

A thin bar fill may be a thin bar near the selected item that fills in a linear manner. For instance, in some example, the thin bar may be a horizontal line beneath the selection that fills from left to right.

An edge fill may occur around the edge of a button, such as around the circumference of a circular button, in a clockwise manner in some examples, and in a counterclockwise manner in other examples, with the entire edge being filled upon a complete fill. In some examples, the edge fill may be continuous around the edge of the button, and in other examples, the edge fill may be fragmented rather than continuous.

One example of a tab fill is a horizontal line underneath a word within a tab, with a lighter line indicating that the tab is active and that the contents are being shown, with the fill starting as a single dot in the center of the horizontal line, growing as a line both to the left and to the right, filling the entire line when the fill is complete.

A toggle button fill may be used for a toggle button that is a slider having a circle that can slide from a left "off" position to a right "on" position. In some examples, such a toggle button fill may happen so that only the area of the circle is gaze-Tillable, and when the select in progress is complete, the toggle animation is triggered.

A cursor fill may be used in which the cursor itself lights up.

In some examples, a button that can toggle on an off may fill in a standard manner when toggled on, and may fill in a reverse matter, from a full fill to empty, when toggled off, with the fill disappearing upon a toggle off selection being completed. For example, a circle button that toggles on and off may be toggled on via a radial fill, and toggled off via the radial fill happening in reverse, with the fill circle getting smaller until disappearing completed once the selection of the toggle off is complete.

The manner in which gaze dwell and other options may be employed for making selections, such as gesture, voice command, and/or the like, may vary in different examples or in different modes of the same examples. For instance, in some examples, all three of gaze dwell, gesture, and voice command may be used to make selections at any time. In other examples, selections via gesture are not possible, but selections may be made via gaze dwell or voice commands, or only via gaze dwell. In other examples, the author can perform selections via gesture at any time, and also via gaze dwell in most operating modes, but in certain operating modes, selection may be possible only via gesture. In some examples, gaze dwell may always be available for selection, but gesture may be required for contextually positioning 3D holograms.

Figure 8:
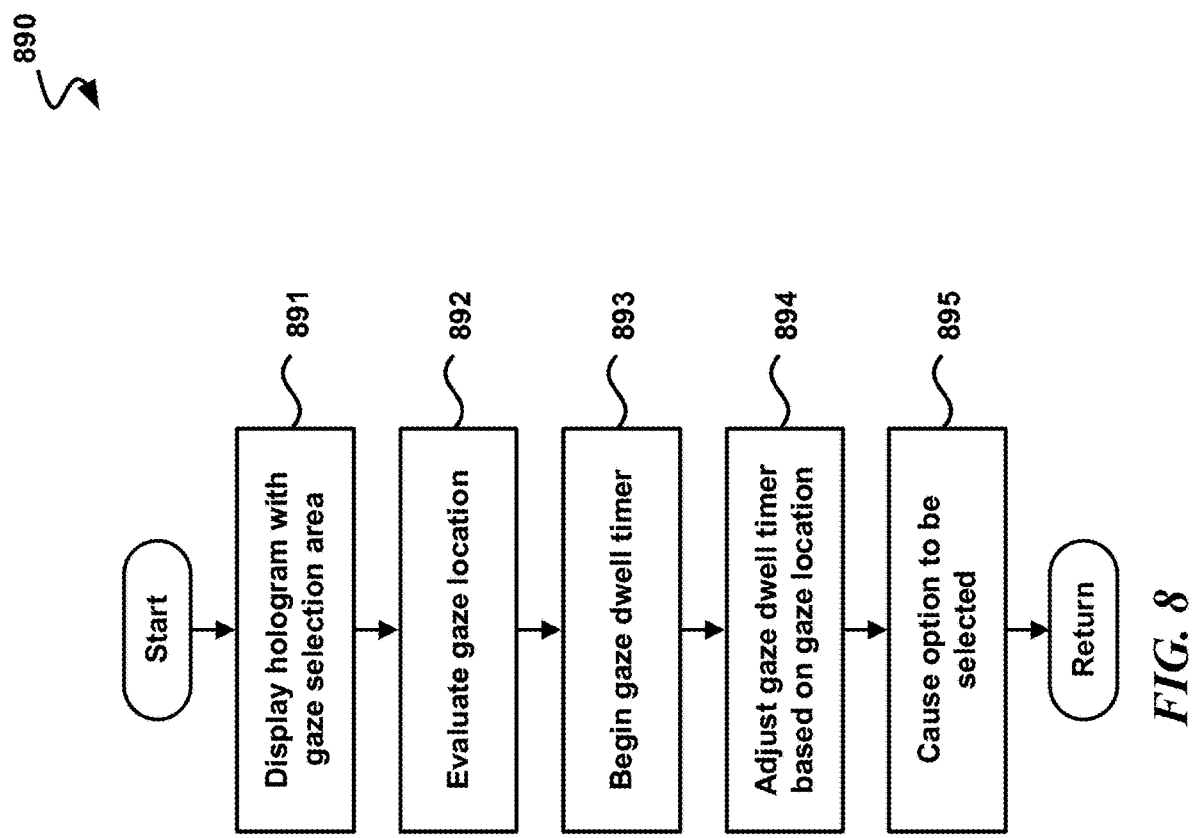
FIG. 8 is a flow diagram illustrating an example of a process of gaze selection, in accordance with aspects of the present disclosure.

FIG. 8 illustrates an example dataflow for a process (890) for gaze selection. In some examples, process 890 is performed by a device, such as device 200 of FIG. 2, MR device 311 of FIG. 3, computing device 10 of FIG. 4, hologram device 501 of FIG. 5, or MR device 601 of FIG. 6.

In the illustrated example, step 891 occurs first. At step 891, in some examples, a first hologram is caused to be displayed to an operator with a first gaze selection area that is associated with a first selectable option. As shown, step 892 occurs next in some examples. At step 892, in some examples, a gaze location that is associated with a gaze of the operator is evaluated. As shown, step 893 occurs next in some examples. At step 893, in some examples, responsive to the gaze location coinciding with the first gaze selection area of the first hologram, a first gaze dwell timer is begun.

As shown, block 894 occurs next in some examples. At block 894, in some examples, a total duration of the first gaze dwell timer is adjusted based on the gaze location being in a specific portion of the first gaze selection area. As shown, block 895 occurs next in some examples. At step 895, in some examples, responsive to the gaze dwell timer finishing, the first selectable option is caused to be selected. The process may then advance to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
causing a first hologram to be displayed to an operator with a first gaze selection area that is associated with a first selectable option;
evaluating a gaze location that is associated with a gaze of the operator;
responsive to the gaze location coinciding with the first gaze selection area of the first hologram, initiating a select-in-progress of the first selectable option by beginning a first gaze dwell timer, wherein progress of the first gaze dwell timer towards expiration of the first gaze dwell timer corresponds to progress of the select-in-progress towards selection of the first selectable option;
adjusting a total duration of the first gaze dwell timer while continually maintaining progress of the gaze dwell timer towards expiration of the first gaze dwell timer after the first gaze dwell timer has started based on the gaze location being in a specific portion of the first gaze selection area; and
responsive to the gaze dwell timer expiring, causing the first selectable option to be selected.

2. The apparatus of claim 1, wherein
adjusting the total duration of the first gaze dwell timer include decreasing the total duration of the first gaze dwell timer responsive the gaze location being in a first portion of the first gaze selection area, and increasing the total duration of the first gaze dwell timer responsive the gaze location being in a second portion of the first gaze selection area.

3. The apparatus of claim 1, wherein the first gaze selection area is an entire area of a button that is associated with the first selectable option.

4. The apparatus of claim 1, the actions further including providing, to the operator, visual feedback that is associated with a rate at which the first gaze dwell timer is expiring.

5. The apparatus of claim 1, the actions further including providing, to the operator, auditory feedback that is associated with a rate at which the first gaze dwell timer is expiring.

6. The apparatus of claim 1, wherein the device is a head-mounted display mixed-reality device.

7. The apparatus of claim 1, the actions further including causing a visual indication of the gaze location to be displayed to the operator.

8. The apparatus of claim 1, the actions further including: responsive to the gaze location leaving the first gaze selection area and a collision area that surrounds the first gaze selection area, deactivating the first gaze dwell timer and resetting the first gaze dwell timer.

9. A method, comprising:
causing a view to be provided to a user, the view including a hologram and a gaze selection area that is associated with a selectable option;
determining a gaze location that is associated with a gaze of the user;
initiating a select-in-progress of the selectable option responsive to the gaze location coinciding with the gaze selection area by starting a gaze dweller timer, wherein progress of the gaze dwell timer towards expiration of the gaze dwell timer corresponds to progress of the select-in-progress towards selection of the selectable option;
causing the gaze dwell timer to continually progress towards expiration after the gaze dwell timer has started while the gaze location coincides with the gaze selection area;
adjusting a speed associated with the gaze dwell timer based on the gaze location being in a specific portion of the gaze selection area, wherein the speed is a rate at which the gaze dwell timer progresses towards expiration; and
causing the selectable option to be selected responsive to expiration of the gaze dwell timer.

10. The method of claim 9, wherein
adjusting the speed of the gaze dwell timer includes increasing the speed of the gaze dwell timer responsive the gaze location being in a first portion of the gaze selection area, and decreasing the speed of the gaze dwell timer responsive the gaze location being in a second portion of the gaze selection area.

11. The method of claim 9, wherein the gaze selection area is an entire area of a button that is associated with the selectable option.

12. The method of claim 9, further comprising providing, to the user, visual feedback that is associated with the speed of the gaze dwell timer.

13. The method of claim 9, further comprising providing, to the user, sonic feedback that is associated with the speed of the gaze dwell timer.

14. The method of claim 9, further comprising: responsive to the gaze location leaving the gaze selection area and a collision area that surrounds the first gaze selection area, deactivating the gaze dwell timer and resetting the gaze dwell timer.

15. A processor-readable storage medium, having stored thereon processor-executable code that, upon execution by at least one processor, enables actions, including:
enabling an operator to use a gaze associated with the operator to begin a select-in-progress of a selectable option;

causing the select-in-progress to continually progress towards selection while the gaze location coincides with the gaze selection area after the select-in-progress has begun;

enabling the operator to use the gaze to adjust a speed associated with the select-in-progress, wherein the speed is a rate at which the select-in-progress progresses towards expiration; and causing the selectable option to be selected responsive to a completion of the select-in-progress.

16. The processor-readable storage medium of claim 15, wherein:

enabling the operator to use the gaze of the operator to begin the select-in-progress of the selectable option includes beginning the select-in-progress of the selectable option responsive to the gaze of the operator coinciding with a gaze selection area that is associated with the selectable option; and adjusting the speed associated with the select-in-progress includes increasing the speed of the select-in-progress responsive the gaze location being in a first portion of the gaze selection area, and decreasing the speed of the select-in-progress responsive the gaze location being in a second portion of the gaze selection area.

17. The processor-readable storage medium of claim 15, wherein enabling the operator to use the gaze of the operator to begin the select-in-progress of the selectable option includes beginning the select-in-progress of the selectable option responsive to the gaze of the operator coinciding with an area of a button that is associated with the selectable option.

18. The processor-readable storage medium of claim 15, the actions further including providing, to the operator, visual feedback that is associated with the speed of the select-in-progress.

19. The processor-readable storage medium of claim 15, the actions further including providing, to the operator, auditory feedback that is associated with the speed of the select-in-progress.

20. The processor-readable storage medium of claim 15, wherein enabling the operator to use the gaze of the operator to begin the select-in-progress of the selectable option includes beginning the select-in-progress of the selectable option responsive to the gaze of the operator coinciding with a gaze selection area that is associated with the selectable option, and wherein the actions further include, responsive to the gaze location leaving the gaze selection area and a collision area that surrounds the first gaze selection area, deactivating the select-in-progress.

* * * * *